(12) United States Patent
Bigex et al.

(10) Patent No.: US 8,701,713 B2
(45) Date of Patent: Apr. 22, 2014

(54) HEATING DEVICE FOR A DEVICE FOR TRANSPORTING A FLUID CONTAINING A HYDROCARBON

(75) Inventors: Thibaud Bigex, Pau (FR); Jérôme Woirin, Pau (FR)

(73) Assignee: Total SA, Courbevoie (FR)

( * ) Notice: Subject to any disclaimer, the term of this patent is extended or adjusted under 35 U.S.C. 154(b) by 11 days.

(21) Appl. No.: 13/641,352

(22) PCT Filed: Mar. 22, 2011

(86) PCT No.: PCT/FR2011/050604
§ 371 (c)(1),
(2), (4) Date: Oct. 15, 2012

(87) PCT Pub. No.: WO2011/128547
PCT Pub. Date: Oct. 20, 2011

(65) Prior Publication Data
US 2013/0025728 A1    Jan. 31, 2013

(30) Foreign Application Priority Data
Apr. 14, 2010    (FR) ..................................... 10 52845

(51) Int. Cl.
*F16L 53/00*    (2006.01)
(52) U.S. Cl.
USPC .................. 138/33; 138/32; 138/34; 137/341
(58) Field of Classification Search
USPC ................................ 138/32, 33, 34; 137/341
See application file for complete search history.

(56) References Cited

U.S. PATENT DOCUMENTS

| 4,281,238 | A | * | 7/1981 | Noma et al. ................... 219/535 |
| 4,407,351 | A | * | 10/1983 | Backlund ......................... 165/45 |
| 5,010,440 | A | | 4/1991 | Endo |
| 6,605,168 | B1 | | 8/2003 | Bleibler et al. |
| 6,939,082 | B1 | * | 9/2005 | Baugh ............................ 405/145 |
| 7,268,562 | B2 | | 9/2007 | Aisenbrey |
| 7,628,943 | B2 | | 12/2009 | Blackmore et al. |
| 2003/0213556 | A1 | | 11/2003 | Blackmore et al. |

(Continued)

FOREIGN PATENT DOCUMENTS

| CN | 2436761 Y | 6/2001 |
| CN | 2475967 Y | 2/2002 |

(Continued)

OTHER PUBLICATIONS

Application and File history for U.S. Appl. No. 13/641,337, filed Oct. 15, 2012. Inventors: Thibaud Bigex et al.

(Continued)

*Primary Examiner* — James Hook
(74) *Attorney, Agent, or Firm* — Patterson Thuente Pedersen, P.A.

(57) ABSTRACT

The invention relates to a heating device for a device for transporting a fluid containing a hydrocarbon. The heating device comprises a rigid structure extending between two lateral walls, forming a space between the lateral walls. A flexible membrane comprising a heating structure extends into the space in order to define, in the space, an inner cavity and an outer cavity. Pumping structure designed to supply a fluid to the inner cavity, remove the fluid therefrom, or keep the fluid therein, in order to bring the membrane into contact with the transport device so as to heat same.

7 Claims, 1 Drawing Sheet

(56) References Cited

U.S. PATENT DOCUMENTS

| | | |
|---|---|---|
| 2006/0102615 A1 | 5/2006 | Carriere |
| 2006/0196568 A1 | 9/2006 | Leeser et al. |
| 2008/0063478 A1 | 3/2008 | Reddy |
| 2008/0066822 A1* | 3/2008 | Varkey et al. ............... 138/124 |
| 2008/0272110 A1 | 11/2008 | Kamiyama et al. |

FOREIGN PATENT DOCUMENTS

| | | |
|---|---|---|
| CN | 2643131 Y | 9/2004 |
| CN | 2775451 Y | 4/2006 |
| CN | 2800021 Y | 7/2006 |
| CN | 201191920 Y | 2/2009 |
| CN | 201354918 Y | 12/2009 |
| EP | 0 312 204 A2 | 4/1989 |
| EP | 1 367 859 A2 | 12/2003 |
| EP | 1 912 006 A2 | 4/2008 |
| EP | 2009338 A1 | 12/2008 |
| FR | 2873952 A1 | 2/2006 |
| FR | 2913364 A1 | 9/2008 |
| GB | 2 182 413 A | 5/1987 |
| GB | 2 247 507 A | 3/1992 |
| GB | 2 446 506 A | 8/2008 |
| WO | WO 96/05386 A1 | 2/1996 |
| WO | WO 97/31507 A1 | 8/1997 |
| WO | WO 97/40309 A1 | 10/1997 |
| WO | WO 99/06652 | 2/1999 |
| WO | WO 99/67561 A1 | 12/1999 |
| WO | WO 01/42338 A2 | 6/2001 |

OTHER PUBLICATIONS

Bardon, et al. "Hydrate Prevention With Electrically Heated Jumpers", Offshore Technology Conference, Apr. 30-May 3, 2007, pp. 1-8.

Application and File history for U.S. Appl. No. 13/641,328, filed Nov. 26, 2012. Inventors: Thibaud Bigex et al.

Application and File history for U.S. Appl. No. 13/641,344, filed Nov. 26, 2012. Inventors: Thibaud Bigex et al.

* cited by examiner

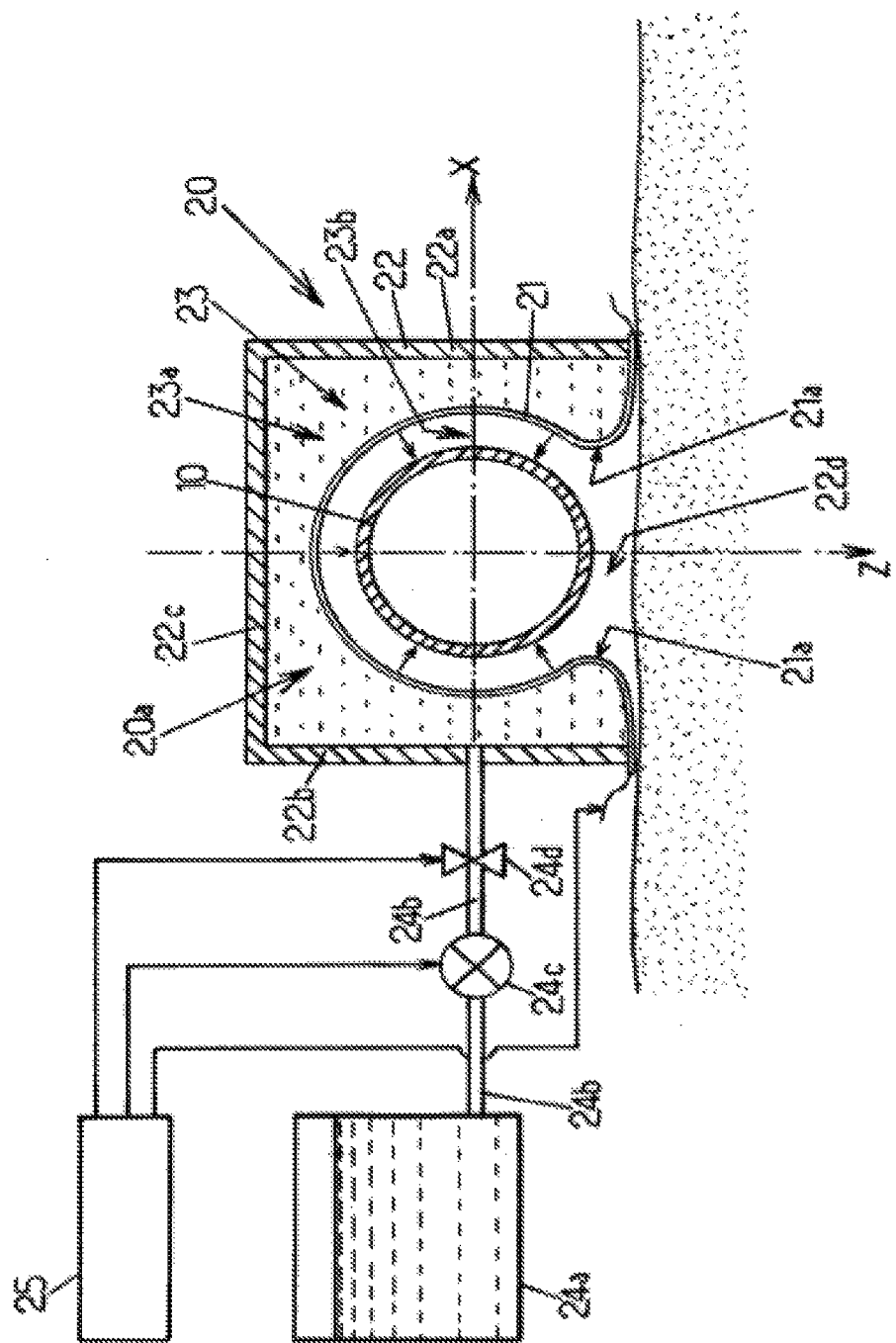

HEATING DEVICE FOR A DEVICE FOR TRANSPORTING A FLUID CONTAINING A HYDROCARBON

PRIORITY CLAIM

The present application is a National Phase entry of PCT Application No. PCT/FR2011/050604, filed Mar. 22, 2011, which claims priority from French Application No. 1052845, filed Apr. 14, 2010, the disclosures of which are hereby incorporated by reference herein in their entirety.

FIELD OF THE INVENTION

This invention relates to a heating device for a device for transporting a fluid containing a hydrocarbon.

BACKGROUND OF THE INVENTION

Devices for transporting hydrocarbons are sometimes installed in very cold environments on land and at sea, sometimes at very great depths underwater. Under such conditions, the fluid may freeze or congeal or paraffin formation may occur. These fluid reactions can cause plugging and interfere with fluid transport in a transportation device such as a pipeline, a line, or a valve. That is why such hydrocarbon fluid transportation devices are sometimes heated to prevent these problems.

Heating covers exist for hydrocarbon pipelines or lines. They are usually wound around the line, and several straps hold it against the line. Document US 2006/102615 describes such a heating cover.

However, such covers are difficult to implement in very cold environments and/or at sea at very great depths. The object of this invention is to avoid the problems encountered.

SUMMARY OF THE INVENTION

A heating device for a device for transporting a fluid containing a hydrocarbon according to one embodiment of the invention includes:
  a rigid structure extending between two side walls, forming a space between the side walls, and comprising an opening in one direction between the two side walls,
  a flexible membrane extending into said space from the side walls, to delimit an inner cavity in the space between said structure and said membrane and an outer cavity between the membrane and the opening, said membrane comprising heating means, the inner cavity being fluid-tight, and the outer cavity being designed to at least partially surround the transportation device,
  pumping means adapted to bring, remove, or maintain a fluid in the inner cavity, said pumping means being designed to inflate the inner cavity to bring the membrane into contact with the transportation device such that the heating means heat the transportation device, and to deflate the inner cavity in order to place or remove the heating device around the transportation device.

With these arrangements, the heating device can be simply installed around the hydrocarbon transportation device, and actuated so that the heating membrane comes into contact with the hydrocarbon transportation device. This membrane naturally adapts to the shape of the hydrocarbon transportation device.

Furthermore, the heating device is removable and can be remotely installed automatically without human intervention.

In various embodiments of the heating device according to the invention, one or more of the following arrangements may optionally be used:
  the pumping means comprise at least one reservoir containing the fluid, one line connecting the reservoir to the inner cavity, one pump suitable for moving fluid between the reservoir and the inner cavity and vice versa, and one valve to close off the inner cavity;
  the heating device also comprises a control means suitable for controlling the pump and the valve, and for causing the heating means for the membrane to heat when the inner cavity is inflated;
  the heating means are at least one electrical conductor, said electrical conductor being suitable for heating the membrane by Joule effect;
  the membrane is made of elastomer and the electrical conductor comprises carbon fibers embedded in the elastomer of the membrane;
  the fluid is a fluid having heat insulation properties, so that the inner cavity thermally insulates the membrane;
  the membrane has a shape suitable for substantially closing the opening when the inner cavity is inflated.

BRIEF DESCRIPTION OF THE DRAWINGS

Other features and advantages of this invention will become apparent from the following description of an embodiment, provided as a non-limiting example, with reference to the attached drawings.

In the drawings:

FIG. 1 is a diagram showing the heating device according to the invention.

DETAILED DESCRIPTION OF THE DRAWING

FIG. 1 is a schematic cross-sectional view of an embodiment of a heating device 20 for a device 10 for transporting a fluid comprising a hydrocarbon such as crude oil, gas, heavy oil, or the like. The illustrated transportation device 10 is a pipe or pipeline having a transverse cross-section that is generally cylindrical in shape. However, any other hydrocarbon transportation device, such as valves, a "Christmas tree," a component for distribution between pipes, a drilling wellhead, or the like is conceivable.

The heating device 20 for a device for transporting a fluid 10 comprises:
  a rigid structure 22, for example having an inverted U shape, extending between two side walls 22a, 22b, forming a space 23 between the side walls,
  a flexible membrane 21 extending into said space 23 from the side walls 22a, 22b, and defining in said space 23 an inner cavity 23a between the structure 22 and the membrane 21, and an outer cavity 23b between the membrane 21 and the opening 22d of the structure 22, and
  pumping means 24 for the inner cavity 23a.

The rigid structure 22 comprises a connection 22c between the side walls 22a, 22b, and an opening 22d between the two side walls 22a, 22b in a direction (direction Z in FIG. 1) opposite said connection 22c.

The inner cavity 23a is substantially closed and fluid-tight.

The outer cavity 23b is open so that the heating device 20 can be installed around the transportation device 10, and said cavity at least partially surrounds said transportation device 10 when the heating device 20 is installed.

The membrane 21 comprises heating means. These heating means may be of any type: circulation of a hot fluid in piping integrated into or integral with the membrane 21, or an electrical conductor integrated into or integral with the membrane 21. This conductor has an electrical resistance R and provides, by Joule effect, a heating capacity $P=Ri^2$ when an electric current i flows through this electrical conductor.

This electrical conductor may be a cable, for example made of copper.

Advantageously, the electrical conductor is made of carbon fibers embedded in an elastomer of the membrane 21. The carbon fibers are distributed over more or less the entire surface of the membrane 21. The membrane 21 is therefore flexible, even in the presence of said electrical conductor. In addition, the electrical conductor is capable of producing a more even heat and is more reliable than a single copper cable, because the carbon fibers connected in parallel all conduct a part of the electric current.

The flexible membrane 21 may be made of elastomer, and for example of a silicone.

The pumping means 24 are adapted to bring, remove, or maintain a fluid in the inner cavity 23a. They make it possible to inflate the inner cavity 23a to bring the membrane 21 into contact with the transportation device 10 such that the heating means heat the transportation device 10. They make it possible to deflate the inner cavity 23a in order to place or remove the heating device 20 around the transportation device 10.

The fluid may be a fluid having heat insulation properties, such as a viscous gel. With this arrangement, when the inner cavity 23a is inflated and the heating means heat the membrane 21, it is more thermally insulated from the external environment of the heating device 20 and the heat produced is concentrated toward the transportation device 10. The heating device 20 is thus more efficient.

In addition, the membrane 21 may have any shape within the space 23. In particular, it may have an inverted U or Ω shape or have at least a portion 21a forming a fold projecting into the space 23 and thus narrowing the opening 22d. With this arrangement, when the inner cavity 23a is inflated, the membrane 21 can come into contact with a larger surface area of the transportation device 10, and possibly close off the opening 22d to better heat the transportation device 10 and insulate it while reducing heat loss.

The pumping means 24 comprise:
a reservoir 24a containing a reserve amount of fluid,
a line 24b connecting the reservoir 24a to the inner cavity 23a of the heating device 20,
a pump 24c suitable for moving fluid between the reservoir and the inner cavity and vice versa, and
a valve 24d to open or close the line 24b.

A control means 25 is adapted to control the pump 24c and the valve 24d, and to heat the heating means for the membrane 21 when the inner cavity 23a is inflated.

To operate the heating device 20:
the valve 24d is opened,
the pump 24c is actuated to move a predetermined amount of fluid from the reservoir 24a to the inner cavity 23a, so that the inner cavity 23a inflates and the flexible membrane 21 expands to come into contact with the transportation device 10,
the valve 24d is then closed to maintain the volume of fluid in the inner cavity 23a and maintain contact between the membrane 21 and the transportation device 10, and
the heating means are actuated to heat the membrane 21 and, by thermal conduction, the transportation device 10.

When the transportation device 10 has been sufficiently heated so that the frozen hydrocarbon plug disappears:
the valve 24d is re-opened,
the pump 24c is actuated to move a predetermined amount of fluid back from the inner cavity 23a to the reservoir 24a, so that the inner cavity 23a deflates and the flexible membrane 21 returns to a position distanced from the transportation device 10, and
the heating device 20 can be removed.

The control means 25 may be placed at a distance from the heating device 20. The heating device 20 can thus be easily installed and removed, automatically and without human intervention at the transportation device 10. In addition, the flexible membrane 21 of the heating device 20 can better enclose the transportation device 10 in order to heat it.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A heating device for a transportation device for transporting a fluid containing a hydrocarbon, comprising:
a rigid structure extending between two side walls, forming a space between the side walls, and comprising an opening in one direction between the two side walls,
a flexible membrane extending into said space from the side walls, to delimit an inner cavity in the space between the structure and the membrane and an outer cavity between the membrane and the opening, said membrane comprising heating means, the inner cavity being fluid-tight, and the outer cavity being designed to at least partially surround the transportation device,
pumping means adapted to bring, remove, or maintain a fluid in the inner cavity, said pumping means being designed to inflate the inner cavity to bring the membrane into contact with the transportation device such that the heating means heat the transportation device, and to deflate the inner cavity in order to place or remove the heating device around the transportation device.

2. The device according to claim 1, wherein the pumping means comprise at least one reservoir containing the fluid, one line connecting the reservoir to the inner cavity, one pump suitable for moving fluid between the reservoir and the inner cavity and vice versa, and one valve to close off the inner cavity.

3. The device according to claim 2, further comprising a control means suitable for controlling the pump and the valve, and for causing the heating means for the membrane to heat when the inner cavity is inflated.

4. The heating device according to claim 1, wherein the heating means are at least one electrical conductor, said electrical conductor being suitable for heating the membrane by Joule effect.

5. The device according to claim 4, wherein the membrane is made of elastomer and the electrical conductor comprises carbon fibers embedded in the elastomer of the membrane.

6. The device according to claim 1, wherein the fluid is a fluid having heat insulation properties, so that the inner cavity thermally insulates the membrane.

7. The device according to claim 1, wherein the membrane has a shape suitable for substantially closing the opening when the inner cavity is inflated.

\* \* \* \* \*